United States Patent Office 3,119,852
Patented Jan. 28, 1964

3,119,852
PREPARATION OF ORGANIC TITANATES
Robert Thomas Gilsdorf, Wilmington, Del., assignor to E. I. du Pont de Nemours and Company, Wilmington, Del., a corporation of Delaware
No Drawing. Filed Aug. 11, 1960, Ser. No. 48,807
4 Claims. (Cl. 260—429.5)

The present invention is directed to a new method for preparing organic titanates by reverse addition of reactants.

The standard method of manufacture of tetraalkyl esters of orthotitanic acid has been to add titanium tetrachloride to the alcohol, then to add ammonia or an amine which reacts with the chloride present to form ammonium chloride or the amine hydrochloride. The salt is then removed by filtration and the product purified by distillation or other suitable means (see Nelles, U.S. 2,187,821). While the method works well, it has an inherent difficulty, i.e., the filtration. The ammonium chloride formed is usually in a finely divided form and, as such, is difficult to filter. Such filtrations must be carried out in a closed system to prevent hydrolysis of the product. Like most filter cakes, these retain a good deal of product which is ultimately lost unless recovered by further manipulations. In all, the filtration step results in an expensive process due to the handling losses and absorptive characteristics of the crystals. It is apparent that these difficulties can be reduced by removing part of the chloride present as hydrogen chloride gas before the ammonia is added. A recently reported solution to the problem (U.S. 2,655,523) consisted of passing an inert gas (e.g., dry air) through the reaction mass before adding the ammonia, then adding sufficient excess liquid ammonia to dissolve the ammonium chloride formed. In an example, dry air was passed through the reaction mass for 12 hours, leading to the removal of 32% of the theoretical amount of hydrogen chloride. If the air treatment be omitted, 18% of the hydrogen chloride is removed at 45–50° during the reaction. While the air treatment is certainly an improvement in that 14% less ammonium chloride is formed after the air treatment, the time consumed in obtaining this result is economically untenable. Dissolving the salt in liquid ammonia certainly eliminates the filtration but high pressure equipment is required to handle liquid ammonia and the excess ammonia must be recovered which increases the cost of the process.

A similar process has been described (U.S. 2,654,770) which utilizes an organic nitrogenous solvent such as formamide to dissolve the ammonium chloride rather than liquid ammonia. This solvent must also be recovered and is more expensive than ammonia.

It is, therefore, an object of this invention to provide a novel process for manufacturing organic esters of ortho titanic acid which process will reduce the amount of ammonium chloride or amine hydrochloride formed.

It is another object of this invention to provide a process, as heretofore described, which process can be completed in an economically feasible length of time.

These and other objects will become apparent in the following description and claims.

More specifically, the present invention is directed to a process for preparing alkyl esters of ortho titanic acid which process comprises adding, under anhydrous conditions and, preferably, a sweep of a dry, inert gas, one mole of titanium tetrachloride to from zero to about three moles of an alcohol containing from two to about twenty-four carbons, said alcohol having the structure

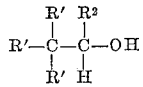

wherein the several R' groups are hydrogen or aliphatic hydrocarbon groups and the R² is hydrogen or an alkyl group, then adding sufficient alcohol to make a total of four or more moles of alcohol, leading to the relatively rapid removal of from about one to about two moles of hydrogen chloride, then adding to said reaction mixture sufficient ammonia or basic organic amine to convert the chloride present to ammonium chloride or amine hydrochloride, adding an inert organic solvent to said reaction mixture at a time chosen from before, during and after the addition of the other reagents, removing the by-product ammonium chloride or amine hydrochloride from said solution and recovering the resulting ester of ortho titanic acid.

Another embodiment of the present invention is a process which comprises adding, under anhydrous conditions and a sweep of a dry inert gas, one mole of titanium tetrachloride to from zero to about one and one-half moles of a diol containing from two to about twenty-four carbons of structure

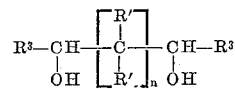

wherein the several R³ groups are hydrogen or a group having the structure

the several R' groups are hydrogen or an aliphatic hydrocarbon group and n is an integer of from zero to about ten, then adding sufficient diol to make a total of from two to four moles of diol, leading to the relatively rapid removal of from about one to about three moles of hydrogen chloride; then adding to said reaction mixture sufficient ammonia or basic organic amine to convert the remaining chloride present to ammonium chloride or amine hydrochloride, adding to said reaction mixture an inert organic solvent at a time chosen from before, during and after the addition of the other reagents, removing the by-product ammonium chloride or amine hydrochloride from said solution and recovering the resulting solution of the ortho titanic acid ester of the diol.

Specific embodiments are the heretofore-described alternative processes and those wherein the reactions of titanium tetrachloride with alcohol and diol are carried out omitting sweep of a dry, inert gas.

The alternative processes of the present invention are called reversed addition. The previously cited Nelles patent calls for the addition of the titanium tetrachloride to all of the alcohol; the present process calls for the addition of at least part of the alcohol to the titanium tetrachloride.

The basic process of the present invention allows some variations which are all modifications of the same basic concept, i.e., that less than four moles of alcohol or two moles of diol should be present until all of the titanium tetrachloride has been added. It is generally preferable to add all of the alcohol or glycol to the titanium tetrachloride (i.e., the titanium tetrachloride is added to zero moles of alcohol or diol) than to add the titanium tetrachloride to part of the alcohol or glycol, then add the remainder of the alcohol or glycol because it is somewhat simpler to operate in this manner. It is definitely not preferred to omit the inert gas sweep since less hydrogen chloride is removed leading to less desirable results. The preferred process can be subdivided according to whether the organic solvent is added before, during or after the reactants. The point of addition of the solvent has no effect on the results but, for ease of operation, it is preferred to add the solvent before the other reactants since it helps to modify the reaction and carry off heat.

The present process in its most preferred form is carried out by dissolving the titanium tetrachloride in an anhydrous, inert organic solvent in a vessel which protects the mixture from the atmosphere and moisture. A continuous sweep of an inert, dry gas is maintained over the surface of the solution. The required quantity of alcohol or glycol (usually a small excess over the theoretical amount to insure completion of the reaction) is then added to the solution. Since the reaction is exothermic, the rate of addition of alcohol or glycol depends mainly on temperature control. Hydrogen chloride forms and is swept out of the system by the inert gas. If the inert gas sweep is omitted, less hydrogen chloride is removed from the reaction zone since only that amount escapes which exceeds the free volume of the reaction vessel. When carried out with the inert gas sweep from about one to about two moles of hydrogen chloride are removed per mole of titanium tetrachloride. Thus, the by-product ammonium chloride is reduced by 25–50%. The exact amount of hydrogen chloride removed depends on the reaction temperature; at about 25° C., about one mole is removed, at about 100° C., two moles or more are removed.

When a glycol is substituted for the alcohol in the above-described process, somewhat more hydrogen chloride is removed than when the alcohol is used. Thus, at 100° C., 57% of the hydrogen chloride is removed in the reaction with n-butyl alcohol and 75% with 2-ethyl-1,3-hexanediol. The cause underlying these observations has not been established to date.

A somewhat less preferred variation of the present process is that wherein the titanium tetrachloride is added to part of the alcohol or glycol (i.e., greater than zero moles of alcohol or diol up to about three moles of alcohol or one and one-half moles of diol) then the remaining alcohol or glycol is added. The amount of hydrogen chloride removed is about the same as that in the more preferred variation described in the preceding paragraphs. Again, omission of the inert gas sweep leads to less desirable results. This variation is less preferred than that previously described solely on the basis that the former is easier to operate. With this, less preferred variation also, it is preferable to add the organic solvent before the other reagents. This, less preferred variation gives better results than the normal addition process as described by Nelles and so it also constitutes an improvement over the art.

The less preferred variation, described in the preceding paragraph, is carried out by adding the theoretical amount of titanium tetrachloride to up to about 75% of the theoretical amount of alcohol or glycol dissolved in an inert, anhydrous organic solvent under a sweep of an inert, dry gas and then adding the remaining amount of alcohol or glycol to this mixture. Again, slightly more than the theoretical amount of alcohol or glycol is used to insure complete reaction.

The 75% figure cited above is somewhat arbitrary. As much as 85–90% of the alcohol or glycol can be added before the titanium tetrachloride with beneficial results. The results obtained when more than 75% of the alcohol or glycol is added initially are less desirable than when 75% or less is added initially, however, so that the latter course of action is preferred. The major consideration which must be observed is that all of the titanium tetrachloride must be added before the fourth full mole of alcohol or second full mole of glycol is added. In other words, the reaction mass should never contain four or more hydroxyl equivalents until all of the titanium tetrachloride has been added.

With both the more and less preferred variations of the present process, as described above, a reaction mass is obtained containing the reaction products of titanium tetrachloride and the alcohol or glycol from which some of the hydrogen chloride has been removed. In either variation, then, sufficient anhydrous ammonia or basic organic amine is added to convert the remaining chloride present to the ammonium salt; at this point the solution is slightly basic. Although almost any basic nitrogen compound can be used for this purpose, ammonia is preferred since it is the least expensive. Other useful bases include methylamine, dimethylamine, trimethylamine, ethylamine, diethylamine, other aliphatic and cycloaliphatic amines, aniline, toluidine and the like, pyridine, picoline and other substituted pyridines. The solid ammonium salt is then removed. At this point the solvent becomes important and it is for this reason that it must be added before the ammonium salt is removed. The ammonium salt is somewhat soluble in the titanium ester product and the presence of the inert solvent causes it to precipitate more completely. The solvent also helps in preventing the product from adhering so strongly to the precipitate. The salt is removed by well-known means. Perhaps the most widely used is filtration but others are available. This portion of the process must, of course, be carried out under anhydrous conditions but the inert gas sweep need not be continued.

Any of the variations of the present novel process may be modified by initiating the addition of ammonia or amine before the addition of alcohol or glycol is complete. Since no further removal of hydrogen chloride is then possible, the advantages of the present process are lost. There is no advantage to beginning the ammonia addition before the alcohol or glycol addition is complete.

The treatment given the salt-free solution obtained after the salt is removed depends on the nature of the product and the end use intended. In many cases, the solution is distilled and the pure titanium ester is isolated. In other cases, particularly those products prepared from high molecular weight alcohols or glycols, the solvent may be removed or the solution may be used as is without further treatment. Many variations within this framework are obvious.

Omission of the inert gas sweep, as was pointed out, causes less hydrogen chloride to be removed. Under otherwise identical conditions at about 30° C. in the reaction of isopropyl alcohol with titanium tetrachloride, 20% of the hydrogen chloride is removed if no sweep is used and 25% is removed if the sweep is used. Thus, the sweep removes 5% more hydrogen chloride, a 25% increase in the amount removed. The sweep therefore has a beneficial effect.

Titanium tetrachloride is preferred in the present process. The other three tetrahalides, the tetrafluoride, the tetrabromide and the tetraiodide, can be used but are considerably more expensive than the tetrachloride.

The inert gas used in the present process must be anhydrous. Almost any inert gas may be used but dry nitrogen or dry air are preferred. To be inert the gas must be free of materials which react with titanium tetrachloride, titanium esters, HCl and ammonia or amines. Obviously, ammonia, sulfur dioxide, the hydrogen halides and halomethanes are unsuitable. Suitable gases other than dry air or nitrogen include helium, neon, argon, oxygen and the saturated, gaseous alkanes.

The inert organic solvent must also be anhydrous. The solvent may be chosen from any liquid organic compound which is inert to titanium tetrachloride, titanium esters, hydrogen chloride, ammonia or amines and in which ammonium chloride or amine hydrochlorides are insoluble. Pure materials need not be used, inert mixtures are quite satisfactory. Typical examples are aliphatic hydrocarbons, aromatic hydrocarbons, haloaromatics and ethers. In general, it is preferred that these solvents have boiling points above about 60° C. It is also necessary that the solvents have melting points below about 20° C. The upper limit on boiling point is not critical but materials boiling above about 200° C. are difficult to remove from the products if that be desired. It is, of course, necessary to choose the solvent so that it may be readily separated from the product being prepared if that be the intent. In general, solvents such as the commercial forms of heptane, octane and mixtures boiling in the same range, benzene, toluene, the xylenes, chlorobenzene, the dichlorobenzenes and chlorotoluene are the preferred solvents.

The alcohols and glycols used in the present process must be either primary or secondary. Tertiary alcohols or glycols as well as allylic or benzylic types cannot be used. Thus the structures

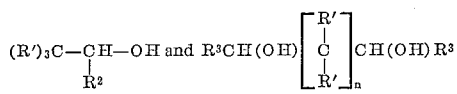

as previously discussed can be utilized. Allylic, benzylic and tertiary hydroxyl groups react very readily with hydrogen chloride to form the allylic, benzylic or tertiary chlorides and water. Other than these exceptions, the only other alcohol or glycol which may not be used is methyl alcohol. Tetramethyl titanate is a solvent insoluble solid which is prepared by special methods. Thus, R', including R' when R³ is (R')₃C, which is hydrogen or an aliphatic hydrocarbon, may be either a saturated or unsaturated hydrocarbon. Typical alcohols which may be used are ethanol, isopropanol, n-butanol, 2-butanol, isobutanol, n-pentanol, n-hexanol, n-heptanol, n-octanol, 2-ethyl-1-hexanol, n-nonanol, n-decanol, n-undecanol, n-undec-10-enol, stearyl alcohol and olelyl alcohol. Typical glycols are 1,2-ethanediol, 1,3-propanediol, 1,2-propanediol, 1,2-butanediol, 1,3-butanediol, 1,4-butanediol, 2,3-butanediol, 1,2-, 1,3-, 1,4- and 1,5-pentanediol, 1,2-, 1,3-, 1,4-, 1,5- and 1,6-hexanediols, 2-ethyl-1,3-hexanediol 1,2-octanediol, 1,8-octanediol and 1,10-decanediol. Other examples include isoamyl alcohol, 3-pentanol, 2-methyl-1-butanol, 3-methyl-2-butanol, 2-octanol, hexadecanol, n-dodecanol, 2-ethyl-1-butanol, 4-heptanol, 2-hexanol, 4-methyl-2-pentanol, 3-pentanol, n-eicosanol, n-henicosanol, n-docosanol, n-tricosanol and n-tetracosanol.

The reaction temperature is not critical. Temperatures between the freezing and boiling temperature of the reaction mixture may be used although a temperature somewhere between the ambient (about 20–25° C.) and the reflux temperature is preferable. It should be noted that more hydrogen chloride is removed, generally, at higher reaction temperatures, so the highest practical temperature is preferred.

The following representative examples illustrate the practice of the present invention.

EXAMPLE 1

This example illustrates the more preferred variation of the present process.

Dry nitrogen was swept across a solution of titanium tetrachloride (138 g., 0.728 mole) in dry industrial grade heptane (Esso, 700 g. containing 2.3% aromatics, 0.6% olefins, 52.5% naphthenes and 40.6% paraffins) at the rate of 1000 cc./min. while anhydrous isopropyl alcohol (43.6 g.) was added to the solution over a period of 20 minutes under anhydrous conditions. The temperature rose about 2° C. from the initial 27° C. Additional anhydrous isopropyl alcohol (174.6 g.) was added during a 15-minute period resulting in a 15° C. temperature rise (total alcohol 218.2 g., 3.64 moles). Anhydrous ammonia was then added to the mixture with external cooling (the nitrogen sweep was stopped) until the mixture was basic, ammonium chloride precipitated. While continued ammonia was added, the mixture was heated under reflux for five minutes to improve the crystal size of the ammonium chloride. The mixture was filtered under anhydrous conditions and the filter cake was washed with dry heptane, reslurried in heptane and refiltered. The resulting filter cake was then dried by being swept with air.

The dried filter cake weighed 117 g. and contained 65.9% chlorine by analysis (pure NH₄Cl contains 66.2% chlorine; 117 g. of NH₄Cl, theory for 4 molar equivalents of NH₄Cl, (155.8 g.), indicating the removal of 1.0 molar equivalents (25%) of the hydrogen chloride during the alcohol addition. The product, tetraisopropyl titanate, B.P. 101–104° C./10 mm., weighed 183 g. after atmospheric distillation of the solvent and vacuum stripping, contained 28.0% Ti as TiO₂ (theoretical 28.1%), and 0.020% chloride, yield 89%. Essentially all of the chloride was removed from the product.

EXAMPLE 2

This example illustrates the more preferred variation of the present process.

Dry nitrogen was swept across the surface of a solution of titanium tetrachloride (138 g., 0.728 mole) in a dry industrial hydrocarbon solvent (700 g.) (boiling range 103 to 109° C., "Esso Laktane," 20% aromatics, 1% olefins, 79% saturated alkanes) at about 1000 cc./min. while the mixture was heated under reflux at 100±2° C. The following additions of anh. n-butyl alcohol were made: 53.9 g. in 30 min., 161.7 g. during 6 hrs., 53.9 g. during 5 min. (total 269.5 g., 3.64 moles). The reaction mass was then cooled to room temperature (weight 1006 g.). It contained 4.38% chlorine indicating that 57% of the chlorine present had been removed as hydrogen chloride (2.28 molar equivalents). The reaction mass was treated with ammonia, heated to reflux, cooled and filtered as described in Example 1. The filter cake was further washed and reslurried with the solvent and refiltered and dried as described in Example 1. The dry filter cake weighed 68 g. (43% of theoretical amount of ammonium chloride).

The product, tetra-n-butyl titanate was distilled at 165–168° C./3 mm. giving 211 g. (85% yield). It contained 23.4% Ti as TiO₂ (theory 23.5%), and nil chlorine.

EXAMPLE 3

This example illustrates the more preferred variation of the present process.

Dry nitrogen was swept at the rate of 1000 cc./min. across the surface of a solution of titanium tetrachloride (138 g., 0.728 mole) in dry benzene (700 g.) while anhydrous 2-ethylhexyl alcohol (94.7 g.) was added during a 20-minute period. The temperature rose from 25 to 26° C., HCl was evolved. Additional 2-ethylhexyl alcohol (378.9 g., total alcohol 473.6 g., 3.64 moles) was added during a 15-minute period with continued nitrogen sweep, giving a temperature rise of 16° C. and further HCl. After these additions, the reaction mass weighed 1260 g. and contained 5.68% chlorine indicating that 30% (1.2 molar equivalents) of the chlorine had been removed as hydrogen chloride.

The reaction mass was then treated with ammonia, heated to reflux, cooled to room temperature and filtered as described in Example 1. The filter cake was washed with benzene, reslurried, refiltered and dried as in Example 1. The cake weighed 124 g. and contained 57.85% chlorine (108.1 g. NH₄Cl, theory for 4 molar equivalents 155.8 g.) indicating that 70% of the chlorine was converted to ammonium chloride.

The benzene and excess alcohol were removed from the filtered solution by atmospheric pressure distillation and stripping at 138° C./100 mm. to yield 336 g. of crude tetrakis(2-ethylhexyl)titanate which contained 16.0% Ti as TiO₂ (theoretical 14.2) indicating the presence of some condensed titanates in the product and 0.003% chlorine, essentially all the chloride was removed. Yield 82%.

EXAMPLE 4

This example illustrates the more preferred variation of the present process.

Dry nitrogen at 1000 cc./min. was swept across the surface of a solution of titanium tetrachloride (138 g., 0.728 mole) in an industrial hydrocarbon solvent (700 g., "Esso Laktane," see Example 2). 2-ethylhexanediol-1,3 (53.2 g.) was added to the solution during 30 minutes while the solution was maintained at 100±2° C. Then further diol (265.9 g.) was added during 6 hours and 106.4 g. during 10 minutes (total 425.5 g., 2.91 mole).

The reaction mass was cooled to room temperature. It weighed 1176 g. and contained 2.17% chlorine indicating that 75% of the chlorine was removed as hydrogen chloride (3 molar equivalents).

The charge was treated with ammonia, heated to reflux, cooled and filtered as described in Example 1. The cake was washed, reslurried, filtered and dried as described. It weighed 36 g.

The solvent was removed from the filtered solution by atmospheric distillation and vacuum stripping at 80° C./100 mm., leaving 441 g. of crude 2-ethyl-1,3-hexanediol titanate, which contained 12.60% Ti as $TiO_2$ and 0.003% Cl, being essentially free of chloride, yield 95.7%.

EXAMPLE 5

This example illustrates the practice of the more preferred variation of the process without the inert gas sweep.

Anhydrous isopropyl alcohol (43.6 g.) was added to a solution of titanium tetrachloride (138 g., 0.728 mole) in heptane (700 g.) during a 20-minute period under anhydrous conditions. The reaction temperature rose from 27 to 28.7° C. and acidic gas was evolved. Additional isopropyl alcohol (174.6 g., total 218.2 g., 3.64 moles) was added over a 15-minute period resulting in a temperature rise from 30 to 46° C.

The reaction mass was then treated with ammonia, heated to reflux, cooled and filtered as described in Example 1. The filter cake was washed with heptane, reslurried, refiltered and dried as in Example 1. The dry cake weighed 126 g. and contained 65.9% chlorine (theory 66.2%), indicating that 0.8 molar equivalent (20%) of the chloride had been removed as hydrogen chloride.

The product (175 g.) contained 28.2% Ti as $TiO_2$ (28.1 theory) and nil chloride, yield 85.3%.

EXAMPLE 6

This example illustrates the partial addition of the titanium tetrahalide to the alcohol followed by the addition of the remainder of the alcohol, i.e., the less preferred variation of the process. Experiments with and without the inert gas sweep are described.

In each experiment, titanium tetrachloride (138 g., 0.728 mole) was added during 20 minutes to a solution of from one to three molar equivalents of anhydrous isopropyl alcohol in heptane. The remaining isopropyl alcohol required to bring the total to five moles per mole of titanium tetrachloride was added during a 15-minute period. The remainder of the process was the same as described in Example 1. The results are recorded in the following table:

*Table*
[Total 5 moles $C_3H_7OH$/mole $TiCl_4$]

| Molar Equiv. of isopropyl alcohol to which $TiCl_4$ was added | Nitrogen Sweep, 1,000 cc./min. | Moles $NH_4Cl$ per mole $TiCl_4$ | Percent HCl Removed | Percent Yield $Ti(OC_3H_7)_4$ | Analysis, Percent Ti as $TiO_2$ (Theory 28.1%) |
|---|---|---|---|---|---|
| 3.0 | No | 3.2 | 20 | 90 | 27.9 |
| 3.0 | Yes | 2.9 | 27 | 86 | 28.1 |
| 2.0 | Yes | 2.9 | 27 | 87 | 28.1 |
| 1.0 | Yes | 3.0 | 25 | 90 | 27.9 |

NOTE.—The only significant effect was the presence or absence of the inert gas sweep.

For sake of comparison, two examples are given below of the Nelles process for preparing tetraalkyl titanates. An inert gas sweep was used in one example but not in the other.

EXAMPLE 7

Titanium tetrachloride (138 g., 0.728 mole) was added under anhydrous conditions to a solution of anhydrous isopropyl alcohol (174.6 g., 2.91 moles) in dry heptane (700 g.) during a twenty-minute period. The temperature rose from 25 to 50° C. at which point external cooling was applied to prevent a further temperature rise. A small amount of acidic gas was evolved. Additional anhydrous isopropyl alcohol (43.6 g., 0.73 mole) was added during a 15-minute period (total alcohol 218.2 g., 3.64 moles).

The reaction mass was then treated with ammonia, heated to reflux, cooled and filtered and the filter cake was washed, reslurried and refiltered as described in Example 1. The filter cake weighed 150 g. and contained 65.1% chlorine (147.2 g. $NH_4Cl$, 2.75 moles, theory 2.91 moles) indicating that 3.8 molar equivalents of $NH_4Cl$ were formed per mole of titanium tetrachloride (5% removal of chloride as hydrogen chloride). The product, after removal of the solvent, was vacuum distilled, B.P. 101–104° C./10 mm., 179 g., 87% yield. The product contained 27.9% Ti as $TiO_2$ (theory 28.1%) and nil chlorine.

EXAMPLE 8

This reaction was carried out in exactly the same manner as Example 7 except that a sweep of dry nitrogen at 1000 cc./min. was passed over the reaction mass during the additions of reactants.

The filter cake weighed 134 g. and contained 65.5% chlorine (132.2 g. $NH_4Cl$, 2.47 moles) indicating that 3.4 molar equivalents of ammonium chloride per mole of titanium tetrachloride were formed (15% removal of chloride as hydrogen chloride). The product (183 g., 89% yield) contained 27.8% Ti as $TiO_2$ (theory 28.1%) and 0.008% chlorine, essentially nil.

It should be noted that when 3 moles or less of alcohol are present when the titanium tetrahalide is added (Example 6) 27% of the hydrogen halide is evolved but when four moles of alcohol are present when the titanium tetrachloride is added (Example 8) only 15% of the hydrogen chloride is removed.

The heretofore-described examples, being carefully performed laboratory experiments, do not truly reflect the effect of the present process on the manufacturing operation. In these examples, the filter cake was carefully extracted with solvent to remove absorbed product. The result is that the yields obtained vary from 82 to 90% and the mode of operation has no consistent effect on the yield. This careful extraction of the filter cake is not used in a commercial manufacturing operation. The value of the product recovered by the extraction of the cake, while significant, is not sufficient to offset the increased operating cost involved. Thus, any method which reduces the amount of filter cake as compared with the Nelles process and, therefore, the amount of product lost through absorption on the cake without involving any increased manufacturing expense is a valuable improvement. The present novel process represents such a contribution. It has been found that commercial yields of titanium esters are increased by use of the present process over those given by the Nelles process without any increase in manufacturing costs. This increase varies with the particular product being manufactured, however, the lowest consistent increase in yield observed was 2%. This may seem small on the surface but, in a large scale operation, a 2% increase results in a considerable increase in the profit margin of the process.

The process of the present invention has other advantages over the Nelles process. The amount of solvent used in either the present process or the Nelles process is determined by the amount of solid ammonium salt formed, with more precipitate, more solvent must be used to produce a slurry which can be handled. Since the present processes produce less ammonium salt, less solvent is required to produce a readily handled slurry. The removal of the solid salt can also be carried out more quickly since both the quantities of solid and solution are smaller. Also, since less solvent is required, a larger quantity of reactants can be used in a given sized reactor than with the Nelles process.

The present process does not completely eliminate the filtration step as does the process described by Herman in U.S. Patent 2,655,523. It should be noted, however, that the Herman process requires the use of high pressure equipment to keep ammonia liquefied while the present process does not. Pressure equipment increases the original investment required and therefore manufacturing costs. It should also be noted that, in the Herman process, the weight of liquid ammonia is at least equal to the titanium ester reaction mixture (no solvent is used). While ammonia is relatively cheap, such large quantities add significantly to the manufacturing costs if not recovered and recovery itself entails added expense. In general, the Herman process gives lower yields than the present process (70–80% compared to 80–90%) and is therefore more expensive to operate in all details.

The present process offers other advantages over both the Nelles and Herman processes. The reaction of titanium tetrachloride with alcohols or glycols is exothermic and, in order to control the reaction temperature, heat must be removed by external cooling. The evaporization of hydrogen chloride from the reaction mixture adsorbs heat. Since more hydrogen chloride is evaporated during the present process than either of the other processes, less cooling is required for the present process than for either of the others.

The neutralization with ammonia is also an exothermic process and heat must be removed. Since less neutralization takes place in the present process, less cooling is required in this step also. Since cooling a reaction involves an added expense, it is apparent that these factors favor the present process. Also, since less neutralization is required, less ammonia is required. This results in a further savings in manufacturing costs.

In addition to the decreased expense due to less cooling and lower ammonia consumption gained by use of the present process, a second major advantage results. Any piece of manufacturing equipment has a limiting capacity for removing heat from a reaction mixture. The rate at which both the reaction of titanium tetrachloride with alcohol and the neutralization can be carried out is therefore limited to the rate at which heat is produced and removed from the system. Obviously, since the present process produces less heat, it can be carried through the neutralization stage more rapidly than the others. As pointed out earlier, the filtration stage of the present process is more rapidly performed than the Nelles process. Since the present process can be carried out more rapidly, more product can be manufactured in a given period of time. It has, in fact, been found that in a typical manufacturing scale set of equipment, the rate of production is about 20% greater with the present process as compared with the art processes. This, of course, results in an increased profit on the product being manufactured which is a desirable result in itself.

Nelles has stated in his patent U.S. 2,187,821, p. 2, col. 1, lines 31–34: "There is no fundamental importance whether the titanium tetrachloride is added to the alcohol or vice versa." It was therefore unexpected and surprising that a very desirable result could be attained by the proper order of addition of reactants. The desirable results have been described above and the discovery of the effect of the order of addition constitutes, therefore a valuable advancement in the art.

Any of the described titanium tetrahalides may be substituted in the preceding examples with any of the heretofore-described alcohols or glycols to give substantially the same result. In addition, any of the heretofore-described inert organic solvents may be substituted in said examples to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive properly or privilege is claimed are defined as follows:

I claim:
1. A process for preparing tetraalkyl esters of ortho-titanic acid, which process comprises adding, under anhydrous conditions, 1 mole of a titanium tetrahalide to from zero to about 3 moles of an alcohol containing from 2 to 24 carbon atoms, said alcohol having the structure

wherein R' is selected from the group consisting of hydrogen and an aliphatic hydrocarbon group and $R^2$ is selected from the group consisting of hydrogen and an alkyl group, followed by adding an amount of said alcohol to give a total of at least 4 moles of alcohol and allowing from one to about three moles of hydrogen halide gas to escape from the reaction mixture during the addition of said alcohol, then adding ammonia to the reaction mixture in an amount sufficient to convert the halide present to by-product halide and adding, at any time prior to removal of by-product halide, an inert organic solvent selected from the groups consisting of saturated aliphatic hydrocarbons, aromatic hydrocarbons and halo-aromatic hydrocarbons, said solvent having a boiling point greater than 60° C. and melting point below 20° C., followed by removing the by-product halide from the reaction mixture and recovering the resulting ester of ortho-titanic acid.

2. The process of claim 1 wherein said alcohol is added to said titanium tetrahalide under a sweep of dry, inert gas.

3. A process for preparing tetra esters of ortho-titanic acid wherein the titanium is attached only to oxygen which is further attached only to carbon, which process comprises adding, under anhydrous conditions, 1 mole of a titanium tetrahalide to from zero to about one and one-half moles of a diol containing from 2 to about 24 carbon atoms, said diol having the structure $$R^3-CH-\left[\begin{array}{c}R'\\|\\C\\|\\R'\end{array}\right]_n-CH-R^3$$
$$\phantom{R^3-C}OH\phantom{XXXXXX}OH$$

wherein $R^3$ is selected from the group consisting of hydrogen and the structure $$-\underset{\underset{R'}{|}}{\overset{\overset{R'}{|}}{C}}-R'$$

R' in said structure is selected from the group consisting of hydrogen and an aliphatic hydrocarbon group, and $n$ in said diol being an integer from zero to about 10, followed by adding an amount of said diol to give a total of from 2 to 4 moles of said diol and allowing from one to about three moles of hydrogen halide gas to escape from the reaction mixture during the addition of said diol, then adding ammonia to the resulting reaction mixture in an amount sufficient to convert the remaining halide present to by-product halide and adding, at any time prior to the removal of the by-product halide, an inert organic solvent selected from the group consisting of saturated aliphatic hydrocarbons, aromatic hydrocarbons and halo-aromatic hydrocarbons, said solvent having a boiling point greater than 60° C. and melting point below 20° C., followed by removing the by-product halide from the reaction mixture and recovering the resulting ester of orthotitanic acid.

4. The process of claim 3 wherein said diol is added to said titanium tetrahalide under a sweep of dry, inert gas.

References Cited in the file of this patent

UNITED STATES PATENTS

| | | |
|---|---|---|
| 2,187,821 | Nelles | Jan. 23, 1940 |
| 2,654,770 | Herman | Oct. 6, 1953 |

OTHER REFERENCES

Nesmeyanov et al.: Chem. Abst. 48, 567 (January 1954).